United States Patent
Li et al.

(10) Patent No.: US 8,382,356 B2
(45) Date of Patent: Feb. 26, 2013

(54) BACKLIGHT MODULE AND METHOD FOR MANUFACTURING SAME

(75) Inventors: Wen-Tao Li, Shenzhen (CN); Sin-Tung Huang, Miao-Li (TW)

(73) Assignee: Chimei Innolux Corporation (TW)

( * ) Notice: Subject to any disclaimer, the term of this patent is extended or adjusted under 35 U.S.C. 154(b) by 573 days.

(21) Appl. No.: 12/625,761

(22) Filed: Nov. 25, 2009

(65) Prior Publication Data

US 2010/0135039 A1  Jun. 3, 2010

(30) Foreign Application Priority Data

Dec. 1, 2008 (CN) .......................... 2008 1 0305890

(51) Int. Cl.
*F21V 7/04* (2006.01)

(52) U.S. Cl. ......... 362/609; 362/632; 362/633; 362/634

(58) Field of Classification Search .................. 362/609, 362/632–634; 349/58
See application file for complete search history.

(56) References Cited

U.S. PATENT DOCUMENTS

| | | | |
|---|---|---|---|
| 7,690,832 B2* | 4/2010 | Kang et al. | 362/634 |
| 7,726,868 B2* | 6/2010 | Terada et al. | 362/633 |
| 8,169,563 B2* | 5/2012 | Lee et al. | 349/58 |
| 2005/0122738 A1 | 6/2005 | Li et al. | |

FOREIGN PATENT DOCUMENTS

| | | |
|---|---|---|
| CN | 1713040 A | 12/2005 |
| CN | 200969009 Y | 10/2007 |
| CN | 201032505 Y | 3/2008 |
| TW | 1241436 B | 10/2005 |
| TW | M318305 | 3/2007 |
| TW | M333541 | 12/2007 |
| TW | M345258 | 4/2008 |

* cited by examiner

*Primary Examiner* — Anabel Ton
(74) *Attorney, Agent, or Firm* — Bacon & Thomas, LLP (57) ABSTRACT

A backlight module includes a light guide plate having a light input surface, a light source adjacent to the light input surface of the light guide plate, and a frame unit receiving the light guide plate and the light source. The frame unit includes a back plate and a light reflective layer. The back plate defines a plurality of openings, and the light reflective layer covers the back plate and fills the openings. A method for manufacturing the backlight module is also provided.

7 Claims, 8 Drawing Sheets

BACKLIGHT MODULE AND METHOD FOR MANUFACTURING SAME

BACKGROUND

1. Technical Field

The present disclosure generally relates to backlight modules and, more particularly to a backlight module used in a liquid crystal display (LCD).

2. Description of Related Art

In a typical liquid crystal display device, the liquid crystal of the pixel matrix does not itself radiate light, relying instead on illumination from an externally powered backlight module.

Figure 8:
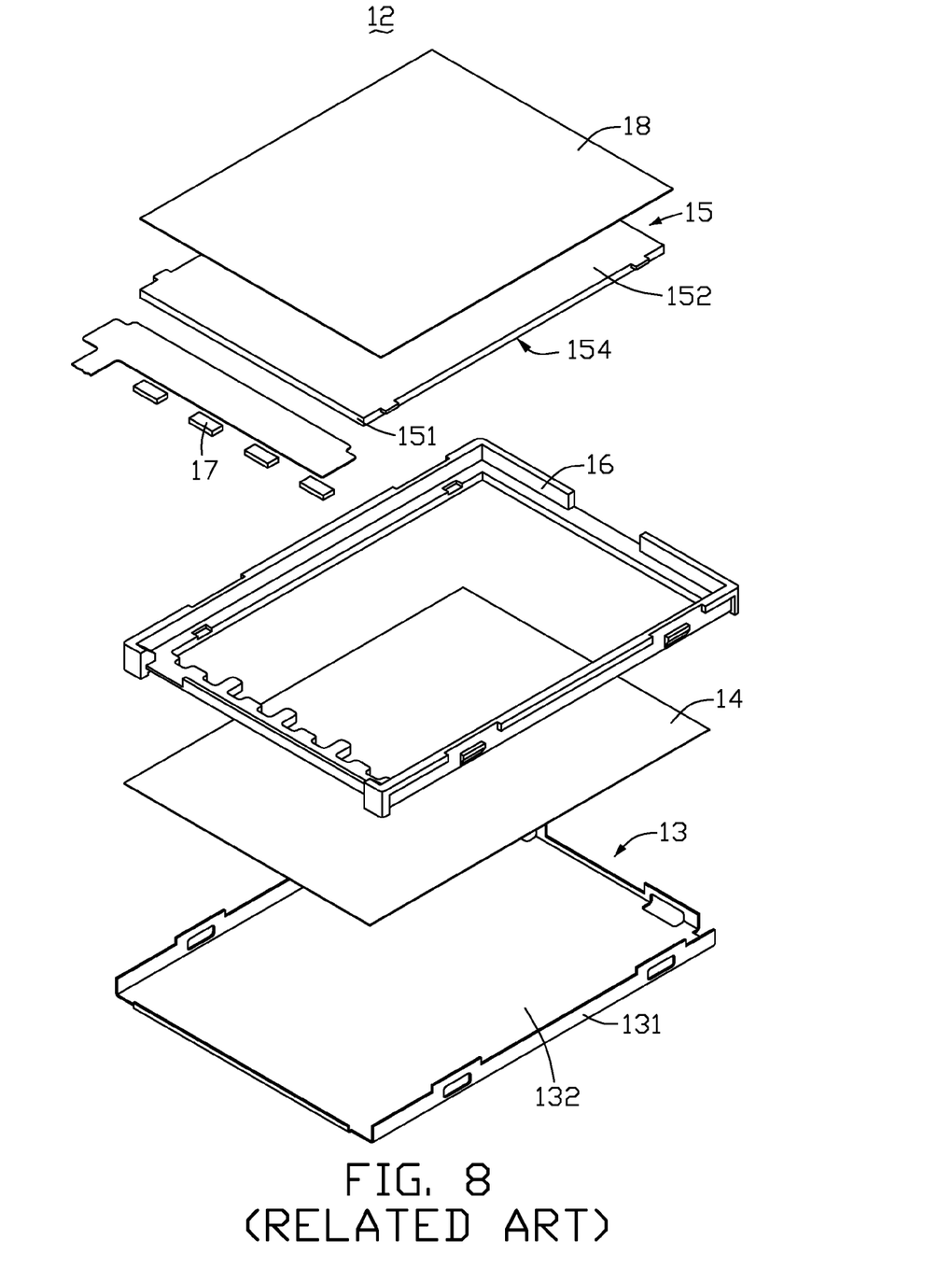
FIG. 8 is an exploded, isometric view of a conventional backlight module.

FIG. 8 illustrates a conventional backlight module 12, which includes a back plate 13, a reflective sheet 14, a light guide plate 15, a frame 16, a plurality of light emitting diodes (LEDs) 17, and a light diffusion sheet 18. The back plate 13 includes a base plate 132, and four sidewalls 131 extending perpendicular from a periphery of the base plate 132. The light guide plate 15 includes a light input surface 151, a top light output surface 152 adjoining the light input surface 151, and a bottom surface 154. The back plate 13 and the frame 16 cooperatively define a receiving space to receive the light reflective sheet 14, the light guide plate 15, the LEDs 17 and the light diffusion sheet 18. The light reflective sheet 14 is positioned between the light guide plate 15 and the back plate 13. The LEDs 17 are regularly arranged adjacent to the light input surface 151 of the light guide plate 15. The light diffusion sheet 18 is disposed on the light output surface 152. The light guide plate 15 further includes a plurality of dots (not visible) formed on the bottom surface 154, to reflect light rays propagating inside the light guide plate 15.

However, because the back plate 13, the reflective sheet 14 and the frame 16 are discrete components, assembly of the back plate 13, the reflective sheet 14 and the frame 16 is relatively complicated and therefore costly. In addition, frequently, gaps occur between the back plate 13 and the frame 16, or between the back plate 13 and the light reflective sheet 14, thereby increasing the overall thickness of the backlight module 12.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
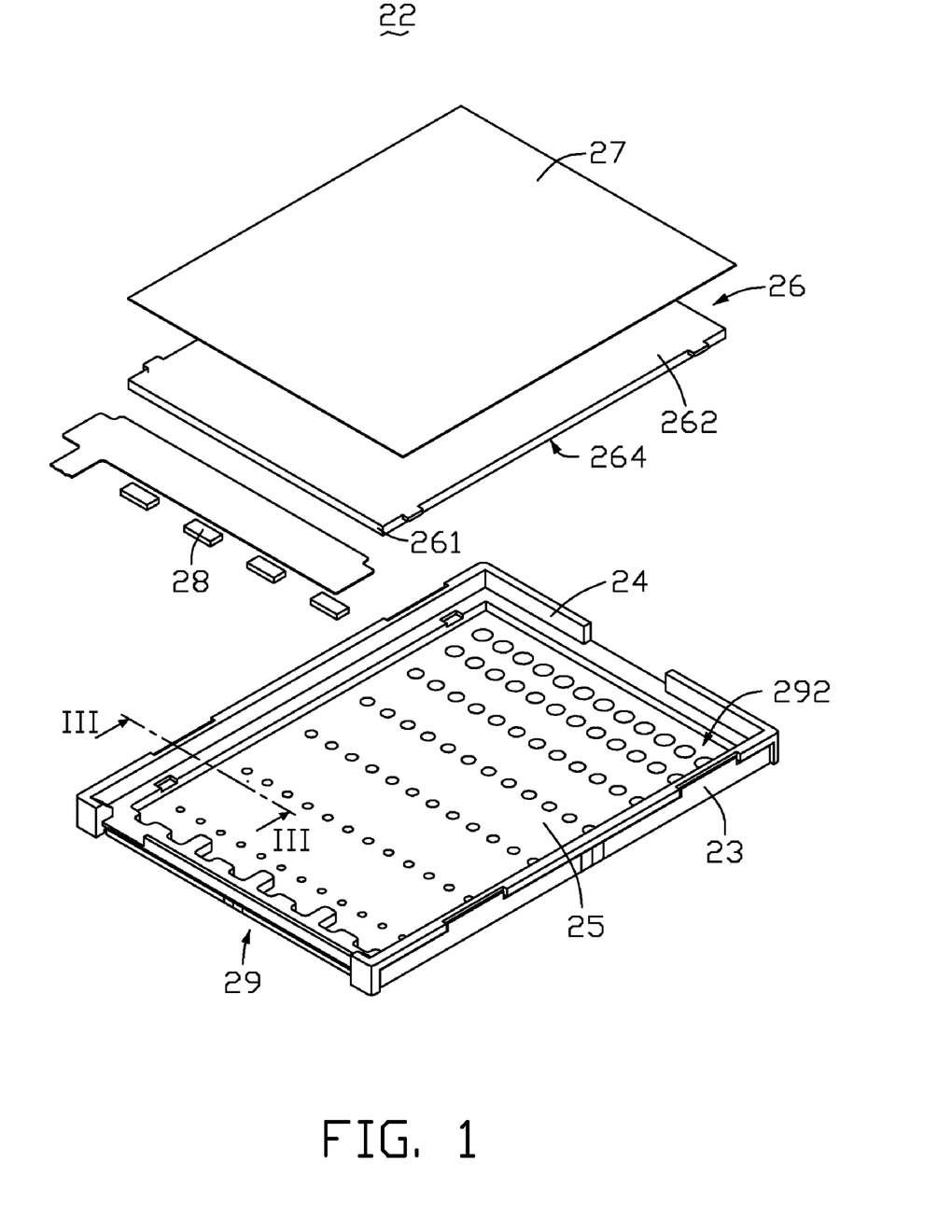
FIG. 1 is an exploded, isometric view of a first embodiment of a backlight module, which includes a back plate.

Referring to FIG. 1, a first embodiment of a backlight module 22 includes a light guide plate 26, a light diffusion sheet 27, a plurality of light sources 28 and a frame unit 29. The frame unit 29 is configured to receive the light guide plate 26, the light diffusion sheet 27, and the light sources 28, and to reflect light rays received from the light sources 28.

The frame unit 29 includes a back plate 23, a frame body 24, and a light reflective layer 25. The back plate 23, the frame body 24, and the light reflective layer 25 are integrally formed, and cooperatively define a receiving space 292 to receive the light guide plate 26, the light diffusion sheet 27 and the light sources 28. The light guide plate 26 includes a light input surface 261, a top light output surface 262 adjoining the light input surface 261, and a bottom surface 264. The light sources 28 are regularly arranged adjacent to the light input surface 261 of the light guide plate 26. The light diffusion sheet 27 is disposed on the light output surface 262 of the light guide plate 26.

Figure 2:
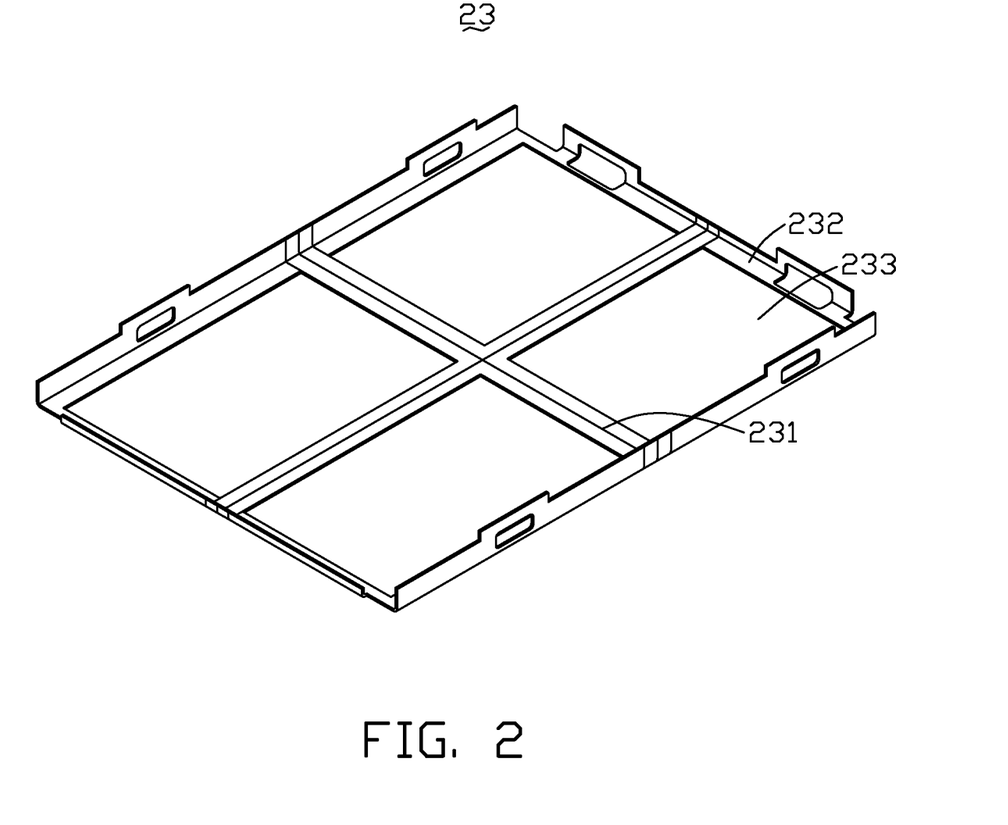
FIG. 2 is an isometric view of the back plate of FIG. 1.

Referring also to FIG. 2, the back plate 23 includes a base plate 231, and four sidewalls 232 extending perpendicular from a periphery of the base plate 231. The base plate 231 defines four rectangular openings 233. The base plate 23 is used to precisely position the light guide plate 26 in the frame unit 29. The back plate 23 is preferably made of metallic material to increase the mechanical strength of the frame unit 29. In the present embodiment, the back plate 23 is of aluminum.

Figure 3:
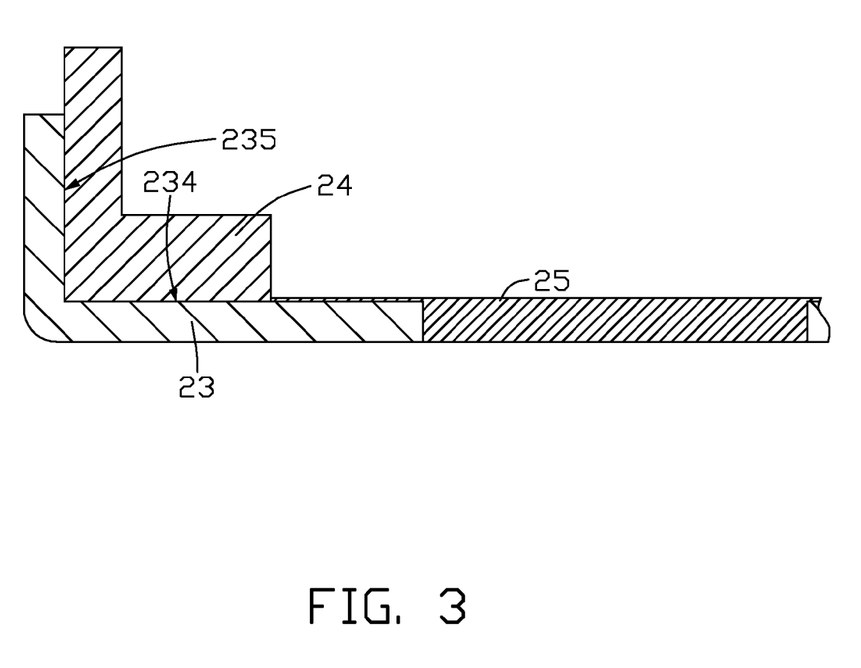
FIG. 3 is a cross-section of the backlight module of FIG. 1, taken along line III-III thereof.

Referring also to FIG. 3, the base plate 231 includes an inner surface 234. The sidewalls 232 include an inner side surface 235, which adjoins the inner surface 234. The frame body 24 is disposed on outer peripheral portions of the inner surface 234 of the back plate 23 and is in contact with the inner side surface 235 of the sidewalls 232. The light reflective layer 25 covers other portions of the inner surface 234 of the back plate 23, and fills the openings 233. The frame body 24 is fixed to the light reflective layer 25. The frame body 24 and the light reflective layer 25 are both made of high reflection resins such as white polycarbonate (PC) or polyethylene terephthalate (PET). In the illustrated embodiment, the frame body 24 and the light reflective layer 25 are both made of white PC. The frame body 24 and the light reflective layer 25 are integrally formed on the back plate 23 by injection molding.

Figure 4:
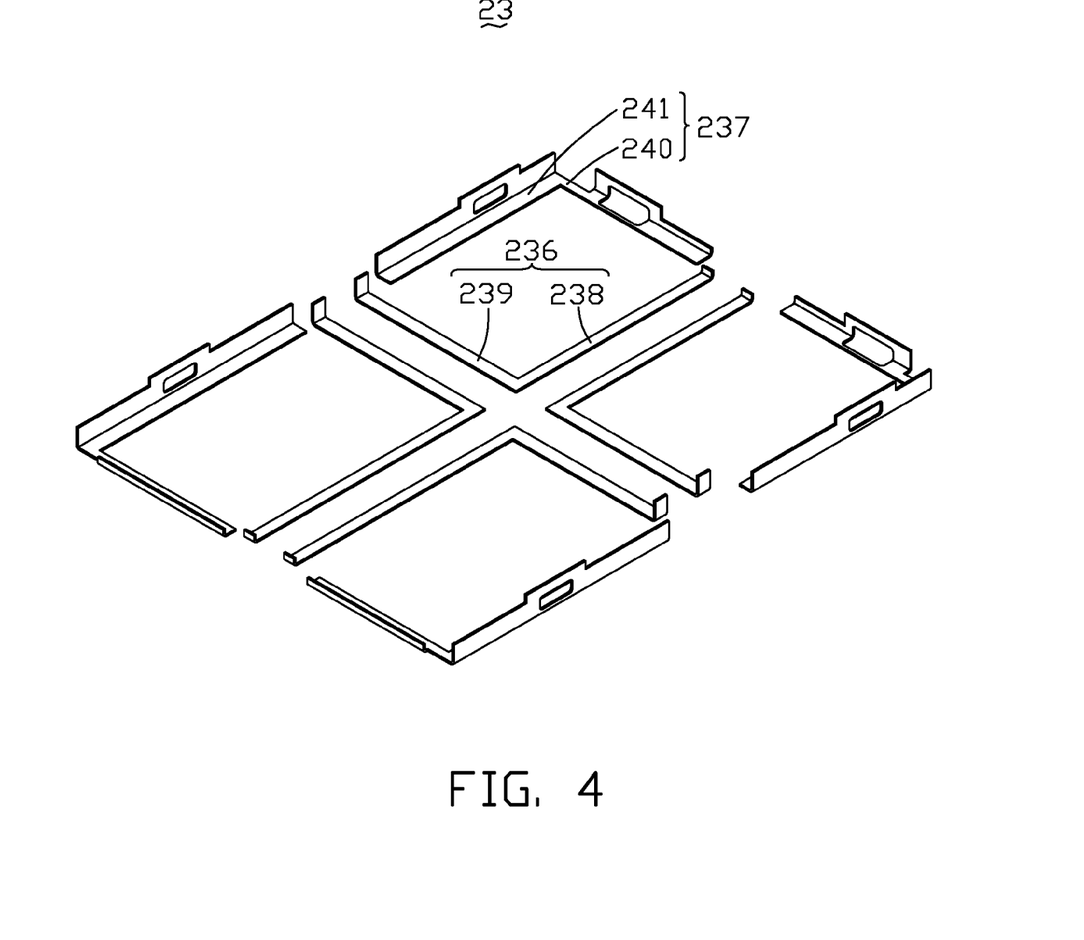
FIG. 4 is an isometric view of components which when assembled together form the back plate of FIG. 2.
Figure 5:
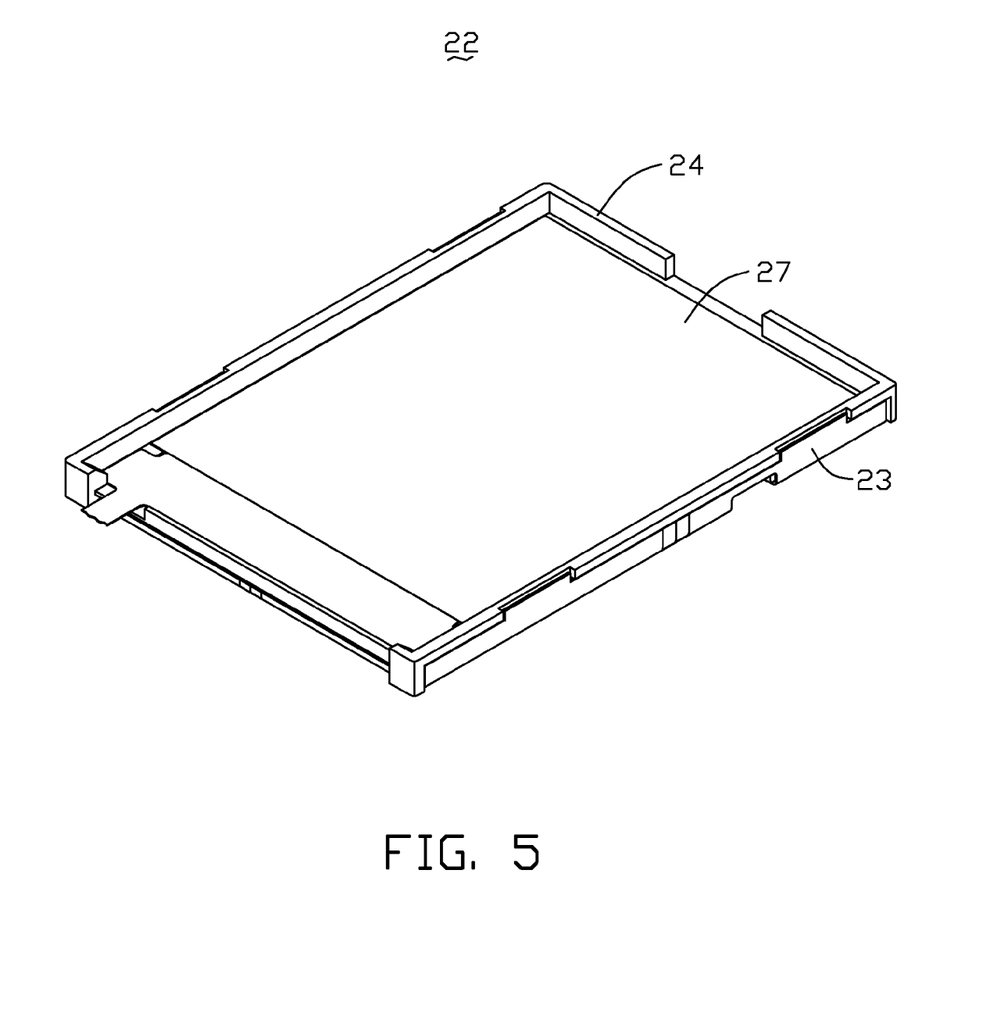
FIG. 5 is an assembled view of the backlight module of FIG. 1.
Figure 6:
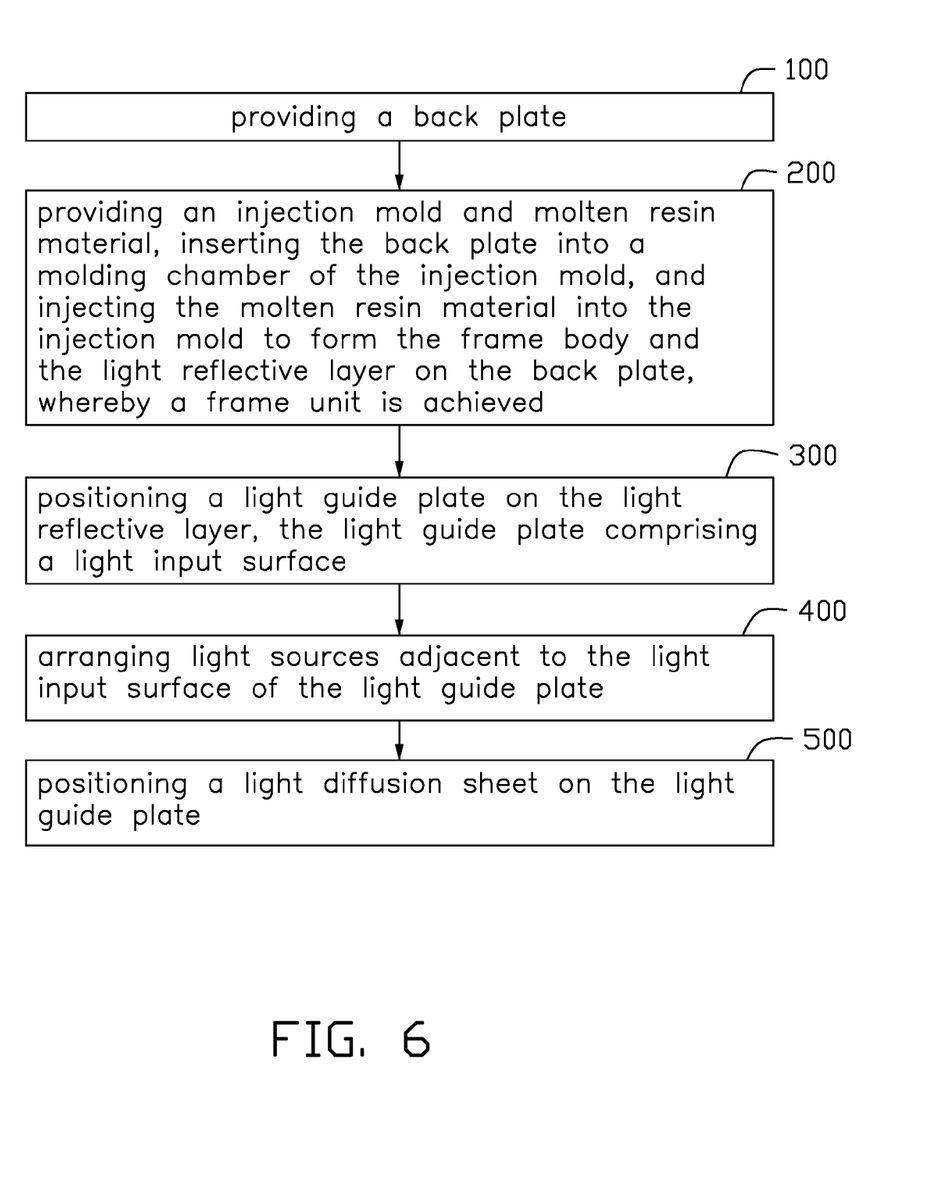
FIG. 6 is flow chart of an exemplary method for manufacturing the backlight module of FIG. 1.

Referring to FIGS. 4 through 6, an exemplary manufacturing method for the backlight module 22 is provided.

In step 100, a back plate 23 is provided. In the illustrated embodiment, four first L-shaped metallic sheets 236 and four second L-shaped metallic sheets 237 are provided, and are welded together to form the back plate 23. Each first L-shaped metallic sheet 236 includes a first arm 238, and a second arm 239 perpendicularly connected to one end of the first arm 238. Each of the first arm 238 and the second arm 239 has a bent portion at its free end to form a portion of the sidewall 232. Each second L-shaped metallic sheet 237 includes a third arm 240, and a fourth arm 241 perpendicularly connected to one end of the third arm 240. Each of the third arm 240 and the fourth arm 241 is a substantially L-shaped structure. In an alternative embodiment, a punched metallic sheet may be produced to achieve the back plate 23.

In step 200, an injection mold (not shown) and a molten white PC resin are provided. The back plate 23 is received in a molding chamber of the injection mold, and the molten white PC is injected into the injection mold to form the frame body 24 and the light reflective layer 25 on the back plate 23. Thereby, the frame unit 29 is obtained.

In step 300, a light guide plate 26 is positioned on the light reflective layer 25.

In step 400, light sources 28 are arranged adjacent to the light input surface 261 of the light guide plate 26.

In step 500, a light diffusion sheet 27 is positioned on the light output surface 262 of the light guide plate 26.

In the backlight module 22, the frame unit 29 is integrally formed by injection molding, and the light reflective layer 25 is fixed to the back plate 23, such that a thickness of the frame unit 29 is minimized. In addition, the frame unit 29 has a relatively light configuration, due to a density of the light reflective layer 25 being less than that of the back plate 23. Furthermore, compared with the conventional backlight module 12, assembly of the backlight module 22 is relatively easy due to the employment of the frame unit 29.

Figure 7:
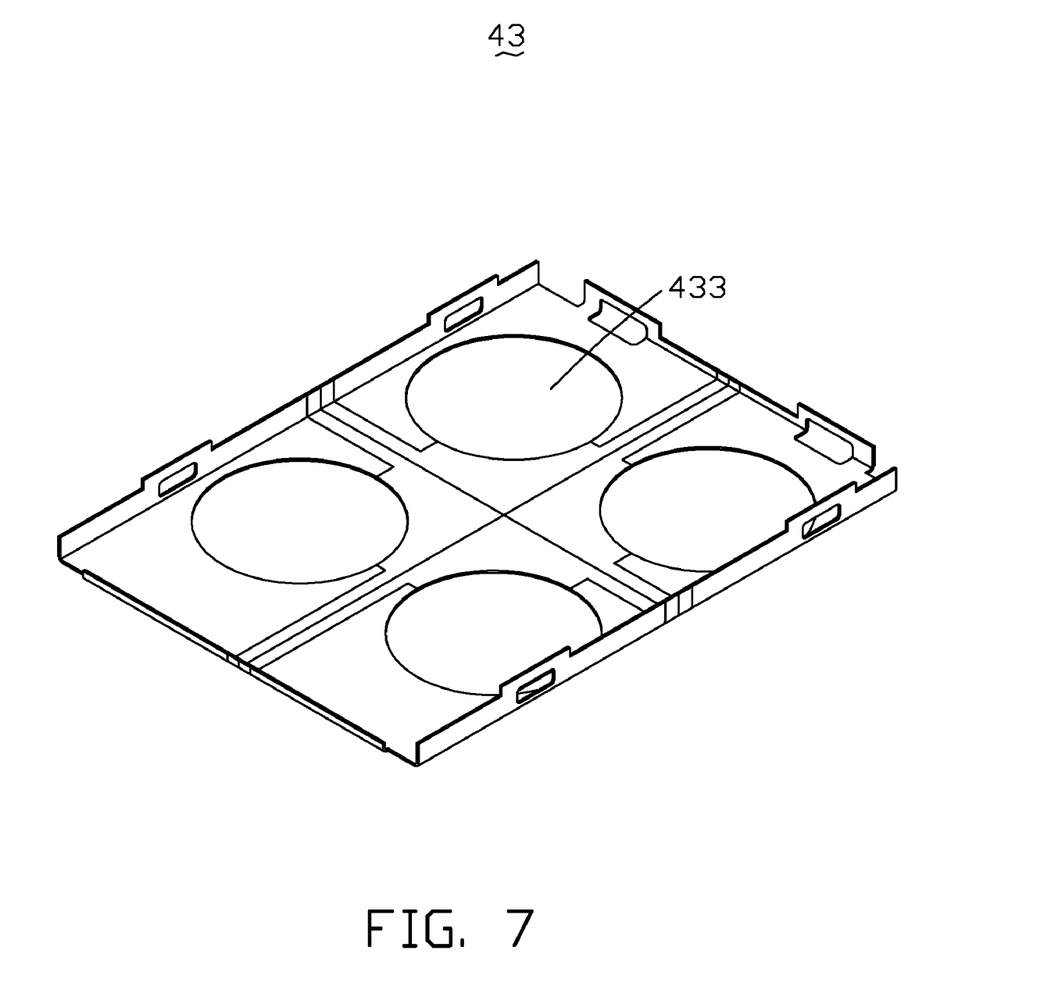
FIG. 7 is an isometric view of a back plate of a second embodiment of a backlight module.

FIG. 7 shows a back plate 43 of a second embodiment of a backlight module, differing from the back plate 23 of the first embodiment only in that that the back plate 43 defines four circular openings 433 therein. It is to be understood that, in alternative embodiments, the openings 233, 433 can be triangular, elliptical or other shapes. The number of openings 233, 433 are specifically described and illustrated for the purpose of exemplifying various aspects of the present back plates 23, 43. In alternative embodiments, other numbers of openings 233, 433 can be employed.

It should pointed out that, in the frame unit 29, the frame body 24 can be omitted, as long as the light reflective layer 25 completely covers the inner surface 234 of the base plate 231.

Finally, while various embodiments have been described and illustrated, the disclosure is not to be construed as being limited thereto. Various modifications can be made to the embodiments by those skilled in the art without departing from the true spirit and scope of the invention as defined by the appended claims.

What is claimed is:

1. A method for manufacturing a backlight module, the method comprising:
    (1) providing four first L-shaped metallic sheets and four second L-shaped metallic sheets, and welding edges of the first and second L-shaped metallic sheets to form a back plate, and defining a plurality of openings therein;
    (2) providing an injection mold and a molten resin material, inserting the back plate into a molding chamber of the injection mold, and injecting the molten resin material into the injection mold to form a frame body and a light reflective layer on the back plate, whereby a frame unit is achieved; and
    (3) providing a light guide plate and a light source, the light guide plate comprising a light input surface; and positioning the light guide plate on the frame unit, and positioning the light source adjacent to the light input surface of the light guide plate.

2. The method of claim 1, wherein each first L-shaped metallic sheet comprises a first arm and a second arm perpendicularly connected to one end of the first arm; and each of the first arm and the second arm has a bent portion at its free end to form a portion of one sidewall of the back plate.

3. The method of claim 1, wherein each second L-shaped metallic sheet comprises a third arm and a fourth arm perpendicularly connected to one end of the third arm; and each of the third arm and the fourth arm is a substantially L-shaped structure.

4. The method of claim 1, wherein the molten resin is material white polycarbonate or polyethylene terephthalate.

5. A method for manufacturing a backlight module, the method comprising:
    (1) punching a metallic sheet to form a back plate, and defining a plurality of openings therein;
    (2) providing an injection mold and a molten resin material, inserting the back plate into a molding chamber of the injection mold, and injecting the molten resin material into the injection mold to form a frame body and a light reflective layer on the back plate, whereby a frame unit is achieved; and
    (3) providing a light guide plate and a light source, the light guide plate comprising a light input surface; and positioning the light guide plate on the frame unit, and positioning the light source adjacent to the light input surface of the light guide plate.

6. The method of claim 5, wherein the molten resin is white polycarbonate or polyethylene terephthalate.

7. The method of claim 5, wherein shapes of the openings of the back plate are selected from the group consisting of circular, triangular, rectangular, elliptical, and any combination thereof.

* * * * *